United States Patent [19]

Delmas et al.

[11] Patent Number: 4,906,487

[45] Date of Patent: Mar. 6, 1990

[54] PROCESS FOR THE PRODUCTION OF AN AROMATIC PRODUCT HAVING THE ODOR AND TASTE OF BLACK TRUFFLES, PRODUCT AND AROMATIC BODY OBTAINED

[75] Inventors: Michel Delmas, Auzeville Tolosane; Antoine Gaset; Charles Montant, both of Toulouse; Pierre-Jean Pebeyre, Cahors; Thierry Talou, Toulouse, all of France

[73] Assignees: Institut National Polytechnique de Toulouse, Toulouse; Pebeyre S.A., Cahors, both of France

[21] Appl. No.: 77,276

[22] Filed: Jul. 24, 1987

[30] Foreign Application Priority Data

Jul. 24, 1986 [FR] France ................. 86 10871

[51] Int. Cl.⁴ .............................. A23L 1/226
[52] U.S. Cl. ..................... 426/534; 426/535
[58] Field of Search ................. 426/535, 534

[56] References Cited

PUBLICATIONS

Talou et al., Principal Constituents of Black Truffle (*Tuber melanosporum*) Aroma, Journal of Agriculture and Food Chemistry, 35, (1987), pp. 774–777.

Furia et al., Fenaroli's Handbook of Flavor Ingredients, 2nd Ed., vol. 1, 1975, CR Press, Inc., Cleveland, Ohio, pp. 353, 354, 355.

Primary Examiner—Donald E. Czaja
Assistant Examiner—Helen Pratt
Attorney, Agent, or Firm—Harold H. Dutton, Jr.

[57] ABSTRACT

A process for the production of an aromatic product having the aroma and taste of black truffles (*tuber melanosporum*) comprising combining dimethylsulfide and methyl-2 butanal, and optionally adding one of more compounds selected from the group consisting of acetaldehyde, methyl-2 propanal, butanone-2, methyl-2 propanol and methyl-2 butanol; the product may be enhanced even further by the addition of one of more of the compounds selected from the group consisting of propanal, anisol, acetone, propanol-1, butanol-2 and ethanol; the aromatic product may also be diluted in a food grade solvent such as a food oil.

5 Claims, No Drawings

PROCESS FOR THE PRODUCTION OF AN AROMATIC PRODUCT HAVING THE ODOR AND TASTE OF BLACK TRUFFLES, PRODUCT AND AROMATIC BODY OBTAINED

This invention relates to a process for the production of an aromatic product with the odor and taste of black truffles (*tuber melanosporum*). The invention also relates to an aromatic product obtained by this process and intended to scent solid or liquid supports, particularly in the food field. The invention also relates to aromatic bodies, scented by means of the product.

BACKGROUND AND OBJECTS OF THE INVENTION

The black truffle tuber melanosporum is a very specific product, the aroma of which bears no relationship to that of other species of truffles (white truffles, i.e. *tuber magnatum*, . . . ), the aroma of the black truffle being the most sought after by reason of its exceptional organoleptic qualities.

At the present time, aromatic products intended to confer upon foods the aroma or taste of the black truffle are prepared essentially, either from the juice of the truffles coming from the [appertisation] of fresh truffles, or by the immersion of fresh truffles into food oils. However, it is known that the black truffle is an exceptionally costly product (2,500 French francs per kilogram in 1986 at purchase in the markets) and accordingly aromatic products obtained from fresh truffles are themselves very expensive. More-over, the underproduction of the truffles does not permit satisfaction of the demand for the products.

Additionally, in the case of juices obtained by cooking in an autoclave, the aroma of the final product is largely changed with respect to the aroma of the fresh products, which is the most desirable. In the case of immersion of cold truffles in food oil, the initial aroma is maintained, but the rapid degradation of the truffle, thus immersed in the oil, requires the use of the product during a very short period of time after preparation (on the order of 15 days), which represents a major practical inconvenience. Such a product cannot be industrially conditioned and the user himself must prepare the product a short time before use, and this, as will be understood, only during the period of production of black truffles.

Several substitution products have been synthesized for permitting an aromatization with an aroma approaching that of the truffle: "Truffle Flavor PG7474 or 7074" sold by the Japanese company "Takata Koryo K.K." or "ruffle Flavour37 sold by the English company "Bush Boake Allen LTD". However, there remains the problem of very imperfect substitutes of which the aroma has only a very distant relationship with that of the natural aromatic products. In any case, these products cannot satisfy the great international demand for products of a quality capable of emitting an aroma faithfully reproducing that of the black truffle. In particular in France, the professionals, restaurateurs, trufficulteurs, preservers, radically reject these substitutes which do not change the opinions of connoisseurs.

The present invention proposes to furnish a new process for fabrication of an aromatic product having the odor and taste of the black truffle ("tuber melanosporum"), not requiring use of the natural product itself in such a manner as to avoid all the constraints associated with the use of the natural product, while conferring upon the aromatic product obtained a remarkable fidelity in the reproduction of the organoleptic characteristics of the aroma of the fresh black truffle.

An essential object of the invention is thus to produce a stable aromatic product having the odor and taste of the fresh black truffle, yielding an industrial grade conditioning without alteration of quality, and a distribution throughout the year.

Another essential object is to provide an aromatic product of which the quality is able to satisfy connoisseurs and professionals.

Another object is to permit obtaining this production process from current, available products at minimal expense, and the production of which involves no significant limitation, in order to permit satisfaction of the demand at a reasonable cost.

DESCRIPTION OF THE INVENTION

The process according to the invention for production of an aromatic product having the odor and taste of black truffles comprises, in its most fundamental mode, the association or combination of two basic compounds: dimethylsulfide and methyl-2-butanal. The dimethylsulfide being considered as the compound of reference, the other basic indicated compound is preferably mixed in proportions of between about 0.3 and 3 times the weight of the reference compound.

The aromatic product conforming to the invention may be manufactured in a concentrated form, by directly mixing the compounds in appropriate proportions. However, to permit a direct and easier use of the product, these compounds are preferably diluted in a food-product solvent or a non-toxic liquid vector of high volatility, in order to disperse them in the medium homogeneously or heterogeneously.

In particular, one can use as a solvent a food oil in order to obtain the aromatic product lending itself to a direct use by the consumer, notably for scenting food products at the time of their preparation. One can also use as the solvent, water, in order to obtain an aromatic water (ice with the aroma of truffles) or ethanol for obtaining an alcoholic drink with the aroma of truffles.

One can also use as a volatile vector, nitrous oxide or trichlorofluoromethane, particularly to realize industrial impregnations of solid supports (food supports such as butter or other supports such as paper impregnated directly or by micro-encapsulation).

In the most significant case of food usage, the weight ratio of dilution of these compounds is advantageously between about 50 to 10,000.

It has been determined that the mixture of the two basic components indicated above will emit an aroma and have a taste reproducing those of the fresh black truffle (*tuber melanosporum*). It should be noted that each of these components, taken individually, leads to an aroma completely nonexploitable, one (dimethylsulfide) having a marked, very disagreeable sulfur aftertaste, the other having the fruity grain without relationship to the aroma of the black truffle. It therefore is completely unexpected to obtain such a remarkable result by mixing the two compounds. It seems that the inappropriate taste of dimethylsulfide is corrected by the methyl-2-butanal in such a manner that the combination of the two furnishes an aromatic product which benefits from a satisfactory aroma and taste. The compounds used are commercially available compounds of little cost, which confers upon the preparation process a considerably reduced price, with respect to those processes using natural black truffles. Moreover, tests have shown that this mixture is stable and does not significantly lose its organoleptic properties over long periods of storage.

The basic aromatic product described above thus provides a substitute satisfying the natural aroma of black truffles, and its aromatic quality is very superior to that of known substitute products.

However, it is possible to improve this aromatic quality at the expense of a slight increase in costs, by combining with the two basic compounds indicated above one or more of five additional compounds or adjuvants as follows:

acetaldehyde, preferably at a weight ratio between about 0.4 and 4 times the weight of the reference compound (dimethlsulfide), methyl-2-propanal, preferably at a weight ratio between about 0.5 and 5 times the weight of the reference compound, butanone-2, preferably at a weight ratio of about 0.3 and 3 times the weight of the reference compound, methyl-2-propanol, preferably at a weight ratio between about 1 and 5 times the weight of the reference compound, methyl-2-butanol, preferably at a weight ratio between about one and five times the weight of the reference compound.

Tests conducted by a panel of tasters have shown that the addition of these compounds perceptibly improves the quality of the aromatic product in accordance with the invention, such that the aroma and taste comes even closer to those of the natural product. In particular, the five additional compounds indicated above may all be combined with the two basic compounds for providing a product of very good quality. For the majority of consumers, the aroma emitted by this product and its taste seem difficult to distinguish from those of fresh, natural truffles. However, connoissuers can still make a distinction in the majority of the tests carried out, while still recognizing the good quality of the product.

According to the present invention, the product may be still further improved to a perfect imitation of the aroma of fresh black truffles, by combining with the basic compounds and the additional compounds mentioned above, one or more compounds or secondary adjuvants of the following group: propanal, anisol, acetone, propanol-1, butanol-2, ethanol.

These compounds are advantageously provided in the following weight ratios with respect to the reference compound (dimethylsulfide):

propanal, between 0.01 and 0.5;
anisol, between 0.01 and 0.5;
acetone, between 0.5 and 2;
propanol-1, between 0.1 and 1;
butanol-2, between 0.01 and 0.1;
ethanol, between 1 and 10.

The invention also relates as well to an aromatic body obtained by incorporating an aromatic product such as that described above. The aromatic body comprises a solid or liquid support upon which is absorbed dimethylsulfide, methyl-2 butanal, and preferably acetaldehyde, methyl-2 propanal, 2-butanone, methyl-2-propanol, and methyl-2-butanol, and optionally propanal, anisol, acetone, 1-propanol, 2-butanol, or ethanol.

DESCRIPTION OF PREFERRED EMBODIMENTS

The following non-limiting examples further illustrate the present invention.

EXAMPLE 1

In 0.01 liter sunflower oil, there is mixed firstly $5 \times 10^{-6}$ liter pure dimethylsulfide with stirring. Then, $5 \times 10^{-6}$ liter methyl-2-butanal are added also with stirring.

One thereby obtains a dilute aromatic product in which the two compounds are in a weight ratio of 1, with a weight ratio of dilution in the oil of 10,000.

A taste test by trufficulteurs has lead to the following evaluation: good taste, but slightly flat with a sulfur grade slightly too accentuated, good base for aromatizing foods in a notable manner such as salads, potatoes, meats, etc.

EXAMPLE 2

In 0.1 liters sunflower oil, there are mixed successively with stirring:

$5 \times 10^{-6}$ l. dimethylsulfide (reference compound),
$5 \times 10^{-6}$ l. methyl-2butanal (weight ratio with respect to the reference compound equal to 1),
$10 \times 10^{-6}$ l. acetaldehyde (ratio: 2).

The weight ratio of dilution of this aromatic product is 5,000.

The taste test has given the following evaluation: richer aroma than the preceding example, slight earthy odor accentuating the "natural" character of the product; the sulfur grade while reduced is still present and greater than that of the aroma of the black truffle.

EXAMPLE 3

In 0.1 liters sunflower oil there are mixed successively with agitation;

$5 \times 10^{-6}$ l. dimethylsulfide,
$5 \times 10^{-6}$ l. methyl-2 butanal (weight ratio with reference compound of 1),
$10 \times 10^{-6}$ l. acetaldehyde (ratio: 2),
$8 \times 10^{-6}$ l. methyl-2-propanal (ratio: 1.6),
$3 \times 10^{-6}$ l. 2-butanone (ratio: 0.6),
$10 \times 10^{-6}$ l. methyl--propanol (ratio: ),
$10 \times 10^{-6}$ l. methyl-2- butanol (ratio: 10).

The weight ratio of dilution of this product is equal to about 2,000.

The taste testing has given the following evaluation: aroma and taste comprising a good reproduction of the aroma and taste of the black truffle; the sulfur grade is good and faithfully reproduces that of the oil of the natural truffle; a slight bitter almond odor is evident and, while not disagreeable, appears slightly stronger than that of the truffle. A distinction between this aromatic product with an oil obtained from natural truffles is not evident.

EXAMPLE 4

In 0.1 liter of sunflower oil, there are mixed successively with agitation:

$5 \times 10^{-6}$ l. dimethylsulfide,
$5 \times 10^{-6}$ l. methyl-2-butanal (weight ratio with the reference compound: 1),
$10 \times 10^{-6}$ l. acetaldehyde (ratio: 2),
$8 \times 10^{-6}$ l. methyl-2-propanal (ratio: 1.6),
$3 - 10^{-6}$ l. 2-butanone (ratio: 0.6),
$10 \times 10^{-6}$ l. methyl-2-propanol (ratio: 2), $10 \times 10^{-6}$ 1. methyl-2-butanol (ratio: 10),
$0.01 \times 10^{-6}$ 1. propanal (ratio: 0.02),
$0.0.1 \times 10^{-6}$ 1. anisol (ratio: 1),
$5 \times 10^{-6}$ 1. acetone (ratio: 1),
$2 \times 10^{-6}$ 1. propanol-1 (ratio: 0.4),
$0.2 \times 10^{-6}$ 1. butanol-2 (ratio: 0.04),
$15 \times 10^{-6}$ 1. ethanol (ratio: 3)

The weight ratio of dilution of the product is equal to about 1,400.

The taste test of this product has given the following evaluation: this product has much greater force, the diverse components of the aroma being improved with respect to the preceding products; it realizes a very good reproduction of the aroma of the truffles, and will likely keep its qualities when it is added to a food product for cooking, even for a prolonged time.

EXAMPLE 5

An aromatic product prepared in accordance with Example 4 is placed in a closed metallic box. The box is stored in ambient air for two months (temperature on the order of 20°0 C.).

After reopening, a taste test lead to the same conclusions as those of Example 4, thus demonstrating the good stability of the product.

While this invention has been described as having certain preferred features and embodiments, it will be appreciated that it is capable of still further variation and modification without departing from the spirit of the invention, and this application is intended to cover any and all variations, modifications and adaptations as fall within the spirit of the invention and the scope of the appended claims.

We claim:

1. A process for imparting the taste and odor of the black truffle (*tuber melanosporum*) to a foodstuff comprising adding to the foodstuff a composition consisting of a mixture of dimethylsulfide, 0.3 to 3 times the weight of dimethylsulfide of methyl-2-butanal and a food grade solvent.

2. A process for imparting the taste and odor of the black truffle (*tuber melanosporum*) to a foodstuff comprising adding to the foodstuff a composition consisting of a mixture of dimethylsulfide, 0.3 to 3 times the weight of dimethylsuslfide of methyl-2-butanal dispersed in a non-toxic liquid vector of high volatility.

3. A flavor modifying composition useful in imparting the taste and odor of the black truffle (*tuber melanosporum*) to a foodstuff comprising a mixture consisting of dimethylsulfide and about 0.3 to 3 times the weight of dimethylsulfide of methyl-2-butanal, said mixture being diluted in a food grade solvent at a weight ratio of dilution betwween about 50 and 10,000.

4. A flavor modifying composition useful in imparting the taste and odor of the black truffle (*tuber melanosporum*) to a foodstuff comprising a mixture consisting of dimethylsulfide and about 0.3 to 3 times the weight of dimethylsulfide of methyl-2-butanal and one of more adjuvants selected from the group consisting of acetaldehyde at 0.4 to 4 times the weight of dimethylsulfide, methyl-2-propanal at 0.5 to 5 times the weight of dimethylsulfide, butanone-2 at 0.3 to 3 times the weight of dimethylsuslfide, methyl-2-propanol at 1 to 5 times thee weight of deimethylsulfide, and methyl-2-butanol at 1 to 5 times the weight of dimethylsulfide, said mixture beig diluted in a food grade solvent at a weight ratio of dilution between about 50 and 10,000.

5. A flavor modifying composition useful in imparting the taste and odor of the black truffle (*tuber melanosporum*) to a foodstuff comprising a mixture consisting of dimethylsuslfide and about 0.3 to 3 times the weight of dimethylsulfide of methyl-2-butanal, one or more adjuvants selected from the group consisting of acetaldehyde at 0.4 to 4 times the weight of dimethylsulfide, methyl-2-propanal at 0.5 to 5 times the weight of dimethylsulfide, butanone-2 at 0.3 to 3 times the weight of dimethylsulfide, methyl-2-propanol at 1 to 5 times the weight of dimethylsulfide, and methyl-b 2-butanol at 1 to 5 times the weight of dimethylsulfide, and one or more secondary adjuvants selected from the group consisting of propanal at 0.01 to 0.5 times the weight of dimethylsulfide, anisol at 0.01 to 0.5 times the weight of dimethylsulfide, acetone at 0.5 to 2 times the weight of dimethylsulfide, propanol-1 at 0.1 to 1 times the weight of dimethylsulfide, butanol-2 at 0.01 to 0.1 times the weight of dimethylsulfide and ethanol 1 to 10 times the weight of dimethylsulfide, said mixture being diluted in a food grade solvent at a weight ratio of dilution between about 50 and 10,000.

* * * * *